(12) United States Patent
Bertrand et al.

(10) Patent No.: US 8,360,368 B2
(45) Date of Patent: Jan. 29, 2013

(54) SPACE VEHICLE SEAT AND SPACE VEHICLE PROVIDED WITH THIS SEAT

(75) Inventors: Jerome Bertrand, Saint Aubin de Medoc (FR); Valery Auger, Arsac (FR); Christian Verny, Champagne (FR); Dominique Bechet, Moragne (FR)

(73) Assignees: Astrium SAS, Paris (FR); Eads Sogerma, Merignac (FR)

( * ) Notice: Subject to any disclaimer, the term of this patent is extended or adjusted under 35 U.S.C. 154(b) by 300 days.

(21) Appl. No.: 12/599,503

(22) PCT Filed: May 15, 2008

(86) PCT No.: PCT/EP2008/055985
§ 371 (c)(1),
(2), (4) Date: Nov. 9, 2009

(87) PCT Pub. No.: WO2008/142002
PCT Pub. Date: Nov. 27, 2008

(65) Prior Publication Data
US 2010/0308175 A1    Dec. 9, 2010

(30) Foreign Application Priority Data
May 15, 2007   (FR) ...................................... 07 55087

(51) Int. Cl.
*B64G 1/52*   (2006.01)
*B64G 1/60*   (2006.01)
(52) U.S. Cl. ............ 244/171.9; 297/344.21; 297/344.24
(58) Field of Classification Search ............... 244/171.9; 296/65.06, 63, 68.1; 297/216.16, 325, 344.1, 297/344.21, 344.23, 344.22, 344.24
See application file for complete search history.

(56) References Cited

U.S. PATENT DOCUMENTS

| 2,067,585 | A | * | 1/1937 | Trimbach ................. 244/122 R |
| 2,611,562 | A | * | 9/1952 | Exton, Jr. ..................... 296/68.1 |
| 2,712,849 | A | * | 7/1955 | Exton, Jr. ................. 297/216.16 |
| 2,924,406 | A | * | 2/1960 | Hildebrand et al. ...... 244/122 A |
| 2,985,413 | A | * | 5/1961 | Von Beckh Widmarsetter ........... 244/122 R |
| 3,135,057 | A | * | 6/1964 | Nelson et al. ................. 244/1 R |
| 3,173,627 | A | * | 3/1965 | Cohen ........................ 244/171.9 |
| RE26,475 | E | * | 10/1968 | Cohen ........................ 244/171.9 |
| 4,160,534 | A | * | 7/1979 | White ........................ 244/135 A |
| 4,175,723 | A | * | 11/1979 | Shea, Jr. ..................... 244/171.9 |
| 4,184,656 | A | * | 1/1980 | Wakeley .................... 244/118.6 |
| 4,645,147 | A | * | 2/1987 | Hendricks .................. 244/137.2 |
| 5,379,701 | A | * | 1/1995 | Sumi et al. .................. 297/344.21 |
| 5,806,910 | A | * | 9/1998 | DeRees ......................... 296/63 |
| 6,523,782 | B2 | * | 2/2003 | Barutt ......................... 244/171.9 |

(Continued)

FOREIGN PATENT DOCUMENTS

| DE | 43 37 019 | 5/1995 |
| DE | 101 08 741 | 9/2002 |

(Continued)

*Primary Examiner* — Michael Carone
*Assistant Examiner* — Steven Hawk
(74) *Attorney, Agent, or Firm* — Nixon Peabody LLP

(57) ABSTRACT

The seat specially designed for space vehicles and in particular space planes comprises a rigid hull and parts of axis of which the direction of alignment passes in front of the occupant of the seat and along him; the seat rotates freely around parts of axis according to the direction of the acceleration in order to always place the occupant in the orientation perpendicular to the forces of acceleration.

14 Claims, 4 Drawing Sheets

U.S. PATENT DOCUMENTS

Figure 1:
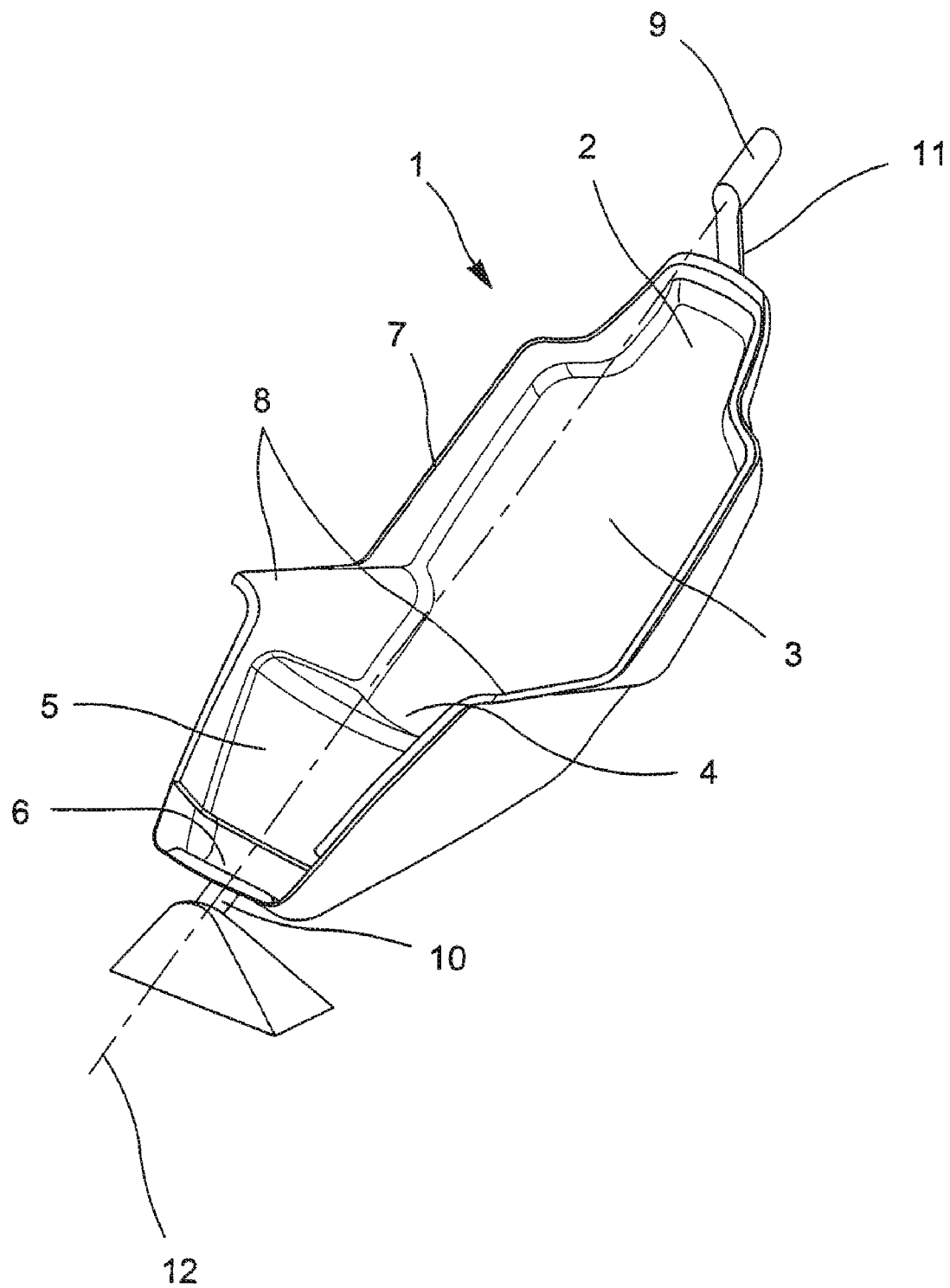

| | | | | |
|---|---|---|---|---|
| 6,935,672 | B2 * | 8/2005 | Dehart | 296/68.1 |
| 7,111,888 | B1 * | 9/2006 | Dehart | 296/68.1 |
| 7,131,382 | B2 * | 11/2006 | Gordon | 104/53 |
| 7,143,981 | B2 * | 12/2006 | Strauss et al. | 244/141 |
| 7,159,923 | B2 * | 1/2007 | Rajasingham | 296/68.1 |
| 7,469,861 | B2 * | 12/2008 | Ferry et al. | 244/118.6 |
| 7,472,957 | B2 * | 1/2009 | Ferry et al. | 297/343 |
| 7,523,888 | B2 * | 4/2009 | Ferry et al. | 244/118.6 |
| 7,770,523 | B2 * | 8/2010 | Kovac | 104/86 |
| 7,905,450 | B2 * | 3/2011 | Kennedy et al. | 244/122 R |
| 2004/0108752 | A1 * | 6/2004 | Rajasingham | 296/189 |
| 2004/0232283 | A1 * | 11/2004 | Ferry et al. | 244/118.6 |
| 2005/0011992 | A1 * | 1/2005 | Ueng | 244/118.5 |
| 2007/0069073 | A1 * | 3/2007 | Ferry et al. | 244/118.6 |
| 2007/0080566 | A1 * | 4/2007 | Ferry et al. | 297/248 |
| 2009/0091171 | A1 * | 4/2009 | Valverde Fernandez | 297/325 |

FOREIGN PATENT DOCUMENTS

ES     2 184 564     4/2003

* cited by examiner

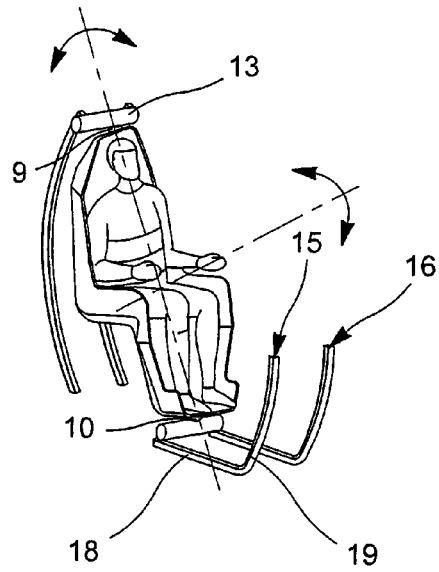
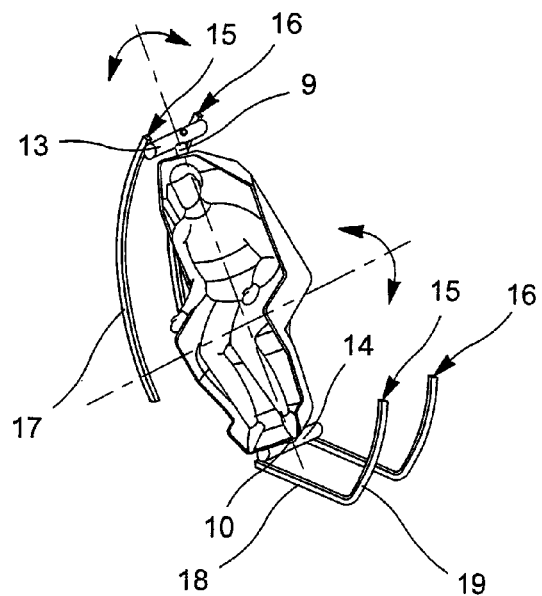
FIG. 2A    FIG. 2B
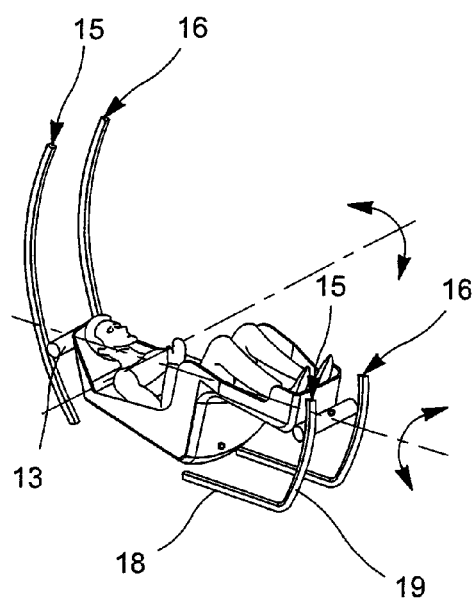
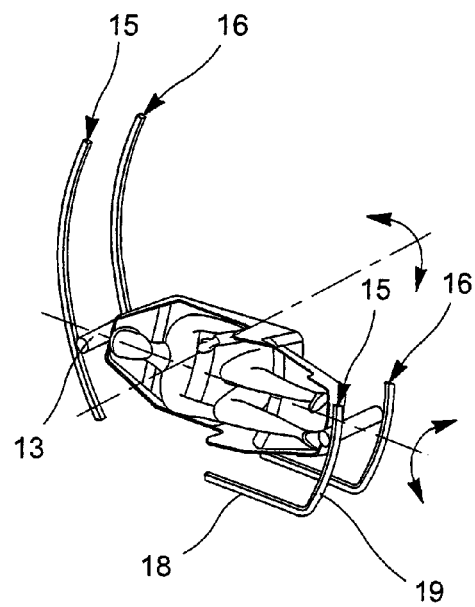
FIG. 2C    FIG. 2D

SPACE VEHICLE SEAT AND SPACE VEHICLE PROVIDED WITH THIS SEAT

CROSS REFERENCE TO RELATED APPLICATIONS OR PRIORITY CLAIM

This application is a national phase of International Application No. PCT/EP2008/055985, entitled "SPACECRAFT SEAT AND SPACECRAFT EQUIPPED WITH SUCH SEAT", which was filed on May 15, 2008, and which claims priority of French Patent Application No. 07 55087, filed May 15, 2007.

TECHNICAL FIELD

The invention relates to a seat to mount in a vehicle and a space vehicle provided with such a seat.

It is sought here to reduce the effects of the accelerations on the occupants of the seats. This problem appears in particular in space transport, whether for rockets or space planes (capable of flights outside of the atmosphere, as such being able to rise to approximately 100 km in altitude, for example). The acceleration can reach from 5 to 10 g for several dozens of seconds during take-off or return phases. If the requirements of comfort are less required with regards to professional pilots, which up until now are almost the only one to have participated in space flights, the plans for extending the latter to the transport of ordinary passengers or even for tourism make improvements to the existing arrangements necessary, either to provide better comfort in the existing flights, or to allow for flights with accelerations higher than those which are planned today, or in order to offer an increased margin of safety, planning for unplanned circumstances such as accidents.

Such is the main objective of the invention. A second objective is to offer original arrangements of the passenger compartment and of the arrangement of the seats in the case of a space vehicle, and in particular of a space plane, i.e. of an aircraft having the general aspect of a conventional plane but designed to reach the limits of the atmosphere or to go beyond them, and which can for example include a rocket propulsion in order to provide it with the required accelerations.

It is well known that Man better resists accelerations oriented in the anteroposterior direction of the body than in the direction of his height, the vertebral column being less loaded for an equal value of acceleration, and that the curled up posture of the body is more advantageous than a stretched out posture in an unfavourable direction. Several documents expose designs of seats intended to make use of these circumstances in order to improve the resistance to the accelerations by modifying the form or the position of ordinary seats. One of the first may be U.S. Pat. No. 2,304,781 which already mentions the interest in orienting the body perpendicularly to the acceleration and which exposes a deformable seat between a vertical seated position, used in ordinary circumstances, and a supine position fully stretched out on the back used in strong accelerations. The curled up position is made use of in U.S. Pat. No. 4,301,983. In U.S. Pat. No. 5,064,146, the occupant of the seat is maintained in an average invariable posture between the extension and curled up, but the inclination of the seat varies in such a way as to present the body in the most favourable orientation.

Others (U.S. Pat. No. 4,243,024, US 2006/0237586 and US 2006/0145021) discuss other arrangements for improving the comfort of the flight counter to accelerations or vibrations, either through an anti-G suit, or by particular arrangements of the seats.

The devices involving modifications to the form or orientation of the seats of this review of prior art are however all relative to atmospheric planes and are intended for their pilots. These designs were not used for space vehicles: the vertical-launch rockets comprise fixed berths wherein the passengers are maintained supine during the phases of strong accelerations.

Seats with variable inclination have been proposed for other vehicles such as automobiles. The purpose sought was again to improve the comfort or the safety of the passenger in special driving conditions or in an accident. ES-U-1 063 217 can be mentioned wherein the seat is suspended from the frame of the vehicle by a Cardan joint of which one axis of rotation is transversal (in the left-right direction of the chassis) and another axis of rotation is directed towards the front of the vehicle. A rotation around the first of these axes is applied in order to adjust the inclination of the driver when he goes up or down a hill, and around the second of these axes in order to give in to the Coriolis forces when the vehicle turns or in order to make it possible to remain vertical when the vehicle is rolling along an inclined plane. The first rotation therefore does not have for main purpose to place the driver in such a way that the acceleration that he undergoes is in the anteroposterior direction of his body, and the second rotation, carried out around an axis perpendicular to the vertebral column, does not have this effect at all.

DE-A-43 37 019 mainly discloses an automobile passenger compartment rotating around a transversal axis in such a way as to optimise the inclination of the driver when an impact occurs. This prior art of rotating seats applied to the automobile as such joins that of planes in that it makes it possible to place the driver in such a way that his body receives the strong acceleration consecutive to an accident in an anteroposterior direction. Most of the rotating seat systems for automobiles cannot however be directly applied to space vehicles, since they are designed for normal driving conditions wherein the accelerations are too weak to threaten the health of the occupants; in addition, the inclinations of the seats, concerning above all the driver, must be controlled in such a way as to maintain the ability to drive, which imposes electrical and mechanical systems of which the inertia is to be avoided for space vehicles which are subjected to substantial and rapid variations in the direction of acceleration but with a high acceleration intensity.

It has been sought to improve the designs of seats presented in prior art in order to apply them more particularly to space vehicles and to passengers concerned with comfort and even with the pleasure of flight and who do not participate in the piloting of the apparatus. It also been kept in mind the need to economically arrange the cabin of the vehicle, in such a way that these passengers retained on the seats are not separated by distances that are too great. Designs wherein the seat makes it possible to modify the posture of the occupant between an extended, seated or stretched out posture, and a curled up posture have been renounced, due to the lack of comfort that such a change in posture would procure. Conventional devices wherein the seat is rotating around a transversal axis in such a way as to vary the inclination of the occupant have also been renounced: if this solution is effective in reducing the most dangerous acceleration, along the body of the occupant, is requires substantial space between the neighbouring seats and it is unpleasant for the passengers, who strongly feel, visually, their change in inclination in the vehicle.

To summarise, a rigid armchair but pivoting has been retained around a substantial longitudinal axis in the direction of the height of the occupant who is therein seated or stretched out, rather than transversal as in certain known designs. This arrangement is original since it does not have recourse to a change in posture or a variation in the inclination of the occupant in the passenger compartment, at least in the simplest embodiments of the invention; but however it makes it possible to place the body of the passenger in a favourable orientation in the characteristic circumstances of space plane flights.

Under a general aspect, the invention also relates to a seat for mounting in a space vehicle, comprising a rigid hull extending from the feet to the head of an occupant of the seat, characterised in that it comprises at least one part of axis to be engaged in a support structure, the part of axis being oriented in a direction of alignment substantially parallel to a longitudinal direction of the occupant and connected to the hull by a connector oriented in such a way that the occupant is at least substantially placed between the hull and the direction of alignment of the part of axis.

The support structure can include a mobile cursor on a track fixed in the vehicle, the cursor being retained on the track. Such an optional device re-establishes the possibility of modifying the inclination of the occupant in the passenger compartment, following the example of already known solutions, and the two-way rotation of the seat which is then possible places the occupant better perpendicularly to the acceleration.

The seat shall be chosen in general with a form of a hull surrounding the body of the passenger with a lateral edge over its entire periphery or the greatest portion in order to better retain it, while protecting it via the stuffing which will line it in general. The seat will normally be free to rotate in order to follow the unplanned accelerations, and thus devoid of rotation control; an absorber can however be added in order to give inertia to its movements, as well as a mechanism for blocking, but which will be active only when the vehicle is stopped, in order to facilitate the embarkation and the disembarkation of passengers.

Another aspect of the invention is a space vehicle and in particular a space plane, characterised in that it comprises at least one seat in accordance with any of the preceding claims in the passenger compartment.

It is advantageous that in such a vehicle, the direction of alignment of the part of axis be substantially perpendicular to the longitudinal direction of the space vehicle, making possible a more favourable arrangement wherein the seats are oriented favourably (perpendicular to the acceleration) during the normal conditions of flight. In addition, the passengers can be close to one another, generally turned towards the wall of the passenger compartment and the portholes which offer them the spectacle of the flight. The requirements to sufficiently fill the passenger compartment and to provide for the comfort of the passengers, which are subjected to movements that are less perceptible than changes in inclination and which more easily enjoy a pleasant outside view, are complied with.

In particular in this configuration of seats and of the seats allow for two-way rotation, the tracks wherein slide the support cursors of the parts of axis of the seats can include a substantially vertical rear portion in the passenger compartment; a substantially horizontal lower portion in the passenger compartment; and possibly an oblique front portion in the passenger compartment, joined to the lower portion. It is then possible to change the orientation of the passenger from a substantially vertical posture, or at least rather vertical than horizontal, to a substantially horizontal posture in the passenger compartment.

In a particular and advantageous arrangement, the direction of the part of axis forms a small angle with the transversal cross-section planes of the space vehicle, the space vehicle comprising a plurality of said seats aligned in the passenger compartment in the longitudinal direction of the space vehicle in a single row, the seats being oriented symmetrically by halves in relation to a sagittal plane (longitudinal, vertical and bisector) of the passenger compartment. Good ease of access to the seats while still allowing for a balanced distribution of the masses in the passenger compartment of the vehicle, and a better arrangement of the volume are as such offered. This small angle can be less than 25°. It is advantageously close to 15°.

In another particular and advantageous arrangement, the inclination of the seats on the horizontal forms an angle of approximately 25° to 40°, which can be approximately 35°.

Figure 3:
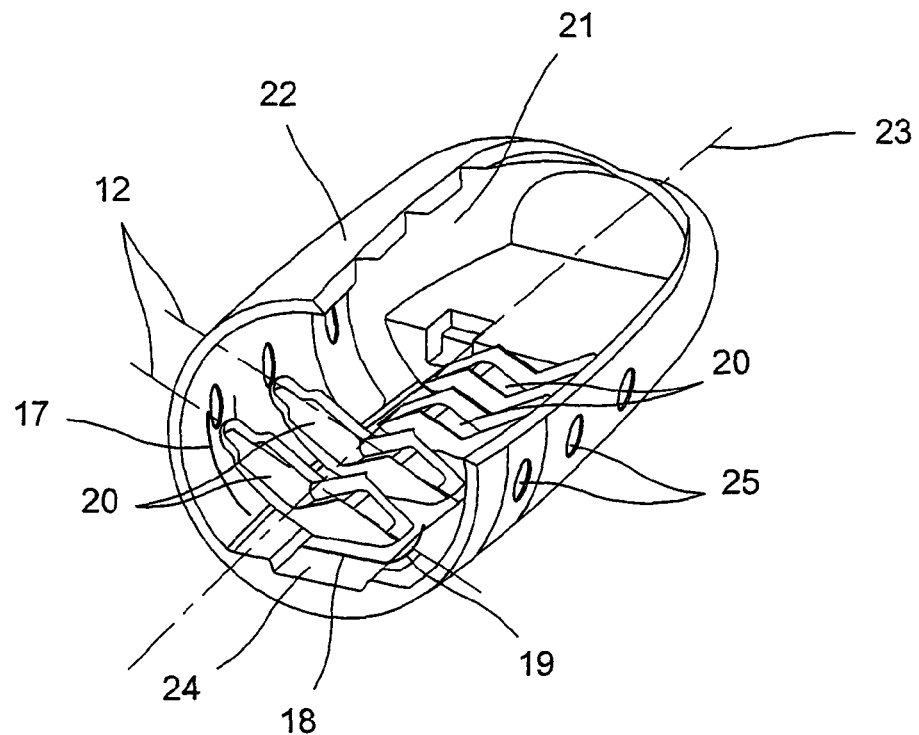
Figure 4:
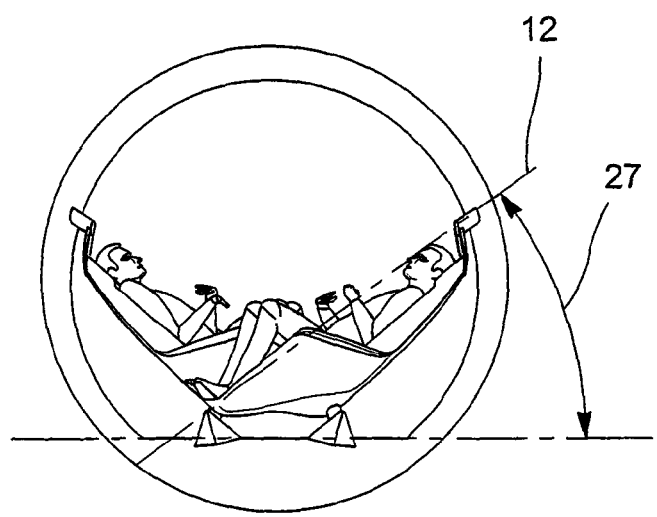
Figure 5:
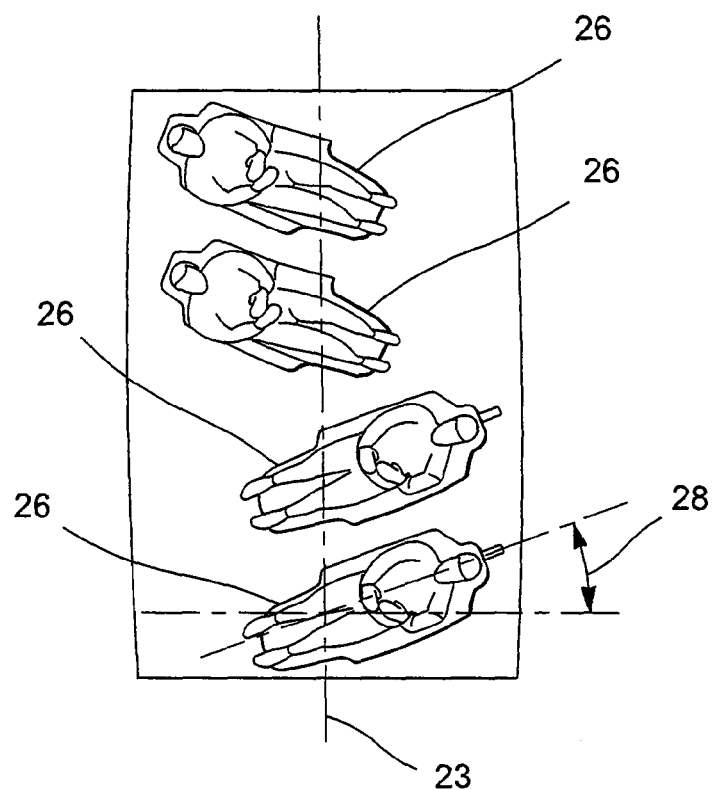
Figure 6:
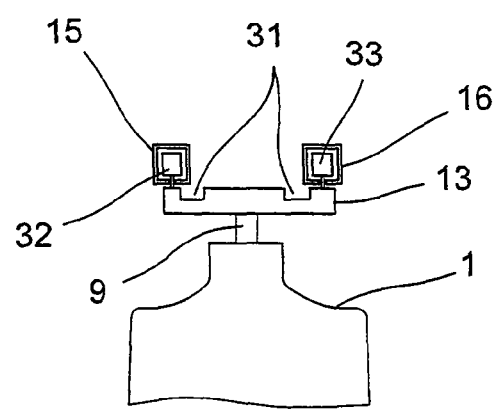

The invention shall now be described in liaison with the figures, of which:

FIG. 1 shows a seat in accordance with the invention,

FIGS. 2A, 2B, 2C and 2D, another embodiment of the seat in accordance with the invention in various states, FIG. 3, an arrangement in perspective of seats in accordance with the invention in a passenger compartment of a space plane, FIGS. 4 and 5, two cross-section views of a passenger compartment of a space plane provided with seats according to the embodiment in FIG. 1, and FIG. 6 shows a possible arrangement.

FIG. 1 shows a seat in accordance with the invention. It comprises a single rigid hull 1 supporting the entire body of the occupant and comprising a headrest 2, a back 3, a seat properly speaking 4 placing the occupant in seated position, a leg rest 5 and a footrest 6 from top to bottom, as well as an edge 7 along the entire periphery and a pair of armrests 8 in appropriate locations of the edge 7. The hull 1, including the edge 7, are formed of a stuffing assisting in the absorbing of the forces of acceleration and in the comfort of the occupant, which is retained even against transversal accelerations. It also includes a pair of parts of axis 9 and 10, the first above the head and the second below the feet; if the latter is connected directly to the hull 1, and more precisely to the edge 7 under the footrest 6, the former is connected to the edge 7 on the headrest 2 by an offsetting arm 11 directed towards the front of the head of the occupant and the hull 1 and of which the effect is to push back the axis of alignment 12 of the parts of axis 9 and 10 forward by the largest portion of the body of the occupant, except at the location of the legs, which results in that the centre of gravity of the unit formed by the seat and by its occupant is shifted by the axis of alignment 12; the axes 9 and 10 are mounted in free or almost free rotation in the structure of the space vehicle.

A mode is shown in FIGS. 2A, 2B, 2C and 2D. The seat in FIG. 1 has its axes 9 and 10 which can be arranged in the fixed bearings of the vehicle, but the axes of the embodiment in FIG. 2 are housed in the centre of the cursors comprised here of an upper cross beam 13 and of a lower cross beam 14 transversal to the seats, parallel to one another and of which the ends are subjected slidingly to the respective track elements 15 and 16 of which each one comprises here a rear portion 17 that is substantially vertical but inclined towards the rear of the occupant, a lower portion 18 that is substantially horizontal and an oblique front portion 19 that can be substantially vertical but inclined towards the front of the occupant. The rear portion 17 can be isolated from the others, which are on the contrary able to be joined as an extension one in relation to the other.

This arrangement makes it possible, starting from a position at rest shown in the FIG. 2A, pivotings of the seat according to the FIG. 2B, a variation of inclination to the seat according to FIG. 2C, or both according to the FIG. 2D. The occupant can as such pass from a substantially vertical or rather vertical than horizontal position, with the head upwards, to a position turned towards one side or the other and to positions that are increasingly tilted towards the rear to substantially horizontal positions, thanks to the front portions 19 of the track elements 15 and 16 which make it possible to raise the feet of the occupant. The forces due to the accelerations themselves place the occupant in the most favourable orientation, perpendicular or as perpendicular as possible to them, thanks to which the position of the centre of gravity of the seat and of its occupant is shifted from the direction of alignment 12 towards the rear, and the track elements 15 and 16 are inclined on the vertical in opposite directions (by separating from one another towards the top) to the front 19, and rear 17 portions, and substantially horizontal to the median portions 18, in such a way that the forces of acceleration directed in the plane of the track elements 15 and 16 always have components that slide the seat along the track.

FIG. 3 shows a possible arrangement of a space plane comprising the seats of the invention, to which has been assigned the reference 20. Four seats 20 are placed in a passenger compartment 21 of the plane delimited by a fuselage 22 that is approximately cylindrical, with a transversal orientation, substantially perpendicular to the longitudinal direction 23 of the plane, of the directions of alignment 12 of the parts of axis. Note that two of the seats 20 are placed as being oriented towards one side of the fuselage, and the two others towards the opposite side; likewise, two of the seats 20 are in engagement with one of the sides of the fuselage 22 and the two others with the opposite side. This fully symmetrical distribution of the seats 20 in relation to a sagittal plane (longitudinal, vertical and bisector) of the passenger compartment 21 guarantees the maintaining of the balance of the masses in the passenger compartment 21.

Seats in accordance with the embodiment in FIG. 2 have been figured. The rear portions 17 of the track elements 15 and 16 can be placed on the fuselage 22, the lower portions 18 on the floor 24 of the passenger compartment 21, and the front portions 19 can be placed on the opposites sides of the fuselage 22 or, as it has been shown here, separated from the latter so as to leave a greater passing space at the foot of the seats 20.

This FIG. 3 makes it possible to include the advantage provided by the invention. Most of the strong accelerations produced during a space flight are orientated in the sagittal plane of the apparatus, but in directions that are highly variable with forces on the occupants oriented towards the rear of the apparatus in the event of a simple increase in the speed or obliquely when a variation in the speed is combined with pitch movements or with a variation of altitude which provides a vertical component to the acceleration. However, the pivoting of the seat around the parts of axis 9 and 10 makes it possible to follow the variations in direction of the forces in the sagittal plane if the direction of alignment 12 of the seat is substantially perpendicular to the sagittal plane or at least the section with a large angle; and the toggle mechanism sliding on the track elements 15 and 16 makes it possible to incline the seat more, rendering the occupant better perpendicular to these forces in the sagittal plane. Although no variation in inclination is possible with the seat in FIG. 1 (which could be used in the embodiment in FIG. 3), its occupant undergoes as such only a low intensity of acceleration in the longitudinal direction of his body, even if the acceleration occurs suddenly, and the seat pivots around the direction of alignment 12 in such a way that the acceleration in the transversal direction (left-right) disappears. Most of the acceleration is therefore felt in the anteroposterior direction of the body. This is better verified with the two-way rotation seat in FIG. 2.

Note that, in this design wherein the passengers are generally across from a side of the fuselage 22, they are placed in front of the portholes 25 which allow them to enjoy the flight in the best conditions.

FIGS. 4 and 5 show another possible arrangement, with seats 26 placed substantially in the same manner as in the preceding arrangements but which are in accordance with the embodiment in FIG. 1 by authorising a simple rotation. The angle 27 of inclination of the directions of alignment 12 of the parts of axis is then fixed and must be chosen according to the specification of the flights in order to minimise the accelerations endured by the occupants; a value of approximately 35° of inclination on the horizontal for this angle 27 can provide good results, by greatly reducing the forces in longitudinal direction of the body that the vertebral column undergoes which still allowing for a pleasant position during the flight without acceleration; lower inclinations on the horizontal can reduce even further these longitudinal forces in that the accelerations exist primarily in the sagittal plane of the apparatus, but the comfort of the occupant at take-off and in uniform flight is not as good and the seat as such occupies more transversal space, which harms the arrangement, in such a way that a relatively large angle 27 can be preferred. And the angle 28 taken by the directions of alignment 12 with the straight sections of the fuselage 22, or in relation to the perpendicular of the longitudinal direction 23, must be low in order to provide the required resistance to the accelerations, but it can be non-zero in order to give the impression of a greater volume and in order to improve the access to the various seats; it can be approximately 20°, and in any case between 15° and 25°. The choice of these two angles will therefore result from the compromise between contrary requirements. The values given here are not absolute, and others may be better with other specifications.

It must be emphasized that the normal arrangement of the seats of planes is towards the front (the angle 28 being equal to 90°) and that if the transversal orientations (the angle 28 being zero) have been adopted at least in land vehicles, angles 28 that are rather low but not zero seem to be new in the vehicles and in particular in aircraft.

The hull 1 of the seat can be lined with a covering assisting in the comfort and in the absorption of impacts, such as leather, foam or both. It also includes safety belts, straps or other equivalent devices for attaching the occupant.

An increased resistance to the accelerations can be provided by a flexibility of the supports of the parts of axes 9 and 10, whether they are fixed to the vehicle or in the form of mobile cursors such as cross beams 13 and 14, and which absorb energy by deforming. Such an idea can be applied especially to the absorbing of substantial accidental impact, and an embodiment would consist in arranging weak points in the supports, such as section strictions which would then undergo permanent deformations.

This is shown in FIG. 6, wherein the cross beam 13 carries a pair of strictions 32 on either side of the root of the part of axis 9, and wherein has also been shown rollers 32 and 33 subject to the cross beam 13 and housed slidingly in the hollow rails of the track elements 15 and 16. Other designs, entailing for example elastic absorbers, remain possible. The cross beam 14 can be designed in the same manner.

It has been discussed that the orientation of the seat around one or two axes of rotation was adjusted automatically by the forces of acceleration, with the mechanism of controls being rejected due to their cumbersomeness and their inertia which can be excessive. A mechanism for blocking can however be added, which makes it possible to maintain the seat in a rest position and which the occupant releases as soon as he is installed and attached. A brake (or absorber) is also added in order to limit the speed and the extent of the movements and to prevent movements that are untimely, too fast, excessive or produced by forces that are too weak; it is particularly suitable to avoid the spinning rotation of seat. Such brakes can be engaged between the parts of axis 9 and 10, and between the rollers 32 and 33 and the rails of the track elements 15 and 16, in order to produce friction.

A type of brakes that are suitable for a light braking comprise a case filled with oil and winglets fixed to one of the parts of axis and agitating the oil when the part of axis rotates in order to produce an absorbing by the forces of viscosity. A type of brakes that are suitable for stronger braking comprises pads pushed back on the part of axis by a spring and rubbing on it. A third type of brakes that can be used is are hydraulic jacks, connected to the part of axis by a lever arm articulated to the piston of the jack, which is displaced in the oil but which has abutment positions. Composite systems can be chosen, or self-disengaging brakes, in order to exert different brakings according to the circumstances, in particular stronger at high rotating speeds, which correspond to turbulences or to other accidental states. The hydraulic brakes have in addition such a braking progression. All of the brakes mentioned, being known to technicians, are not further described here.

The occupant can as such be in a stretched out position in the seat, which then no longer comprises the portion 4. The offsetting arm could be replaced with another portion of connection between the corresponding part of axis 9 and the hull 1, as a curved extension of the hull 1.

The invention claimed is:

1. Seat for mounting in a space vehicle, comprising a rigid hull extending from the feet to the head of an occupant of the seat, comprising at least one part of axis to be engaged in a support structure, the part of axis being oriented in a direction of alignment that is substantially parallel to a longitudinal direction of the occupant and connected to the hull by a connector wherein the seat is free to turn around the direction of alignment and devoid of rotation control, and the direction of alignment extends in front of most of the seat so that a center of gravity of the seat and the occupant is shifted away from the direction of alignment.

2. Seat according to claim 1, wherein the hull is formed with a shape allowing the occupant in a seated position.

3. Seat according to claim 1, comprising two parts of axis, the parts of axis being aligned and placed in two opposite ends of the seat in the longitudinal direction of the occupant.

4. Seat according to claim 1, wherein the support structure comprises a mobile cursor on a fixed track in the space vehicle and retained on the fixed track.

5. Seat according to claim 4, wherein the mobile cursor is an extended cross beam, the fixed track is double and formed of two parallel elements, the extended cross beam receiving the part of axis in a mid-length portion and being respectively retained on the fixed track elements by two opposite end portions.

6. Seat according to claim 1, comprising a peripheral edge extending over a periphery and surrounding the occupant.

7. Space vehicle capable of flight outside of the atmosphere, comprising at least one seat in accordance with any of the preceding claims in a passenger compartment and the direction of alignment of the part of axis is substantially perpendicular to longitudinal direction of the space vehicle.

8. Space vehicle according to claim 7, wherein the support structure comprises a mobile cursor on a fixed track in the space vehicle and retained on the fixed track, and the fixed track comprises a substantially vertical rear portion in the passenger compartment and a substantially horizontal lower portion in the passenger compartment; the substantially vertical rear portion being placed on a fuselage of the space vehicle, and the substantially horizontal lower portion on a floor of a passenger compartment of the space vehicle, the direction of alignment of the part of axis allowing for inclinations varying between an inclination that is substantially vertical and a substantially horizontal inclination in the passenger compartment.

9. Space vehicle according to claim 8, wherein the fixed track comprises an oblique front portion in the passenger compartment and connected to the lower portion.

10. Space vehicle according to claim 7, comprises comprising a plurality of said seats aligned in the passenger compartment in the longitudinal direction of the space vehicle in a single row, the seats being arranged symmetrically by halves along a longitudinal, vertical and bisector plane of the passenger compartment.

11. Space vehicle according to claim 7, wherein the direction of alignment of the part of axis forms a non-zero angle with a plane perpendicular to the longitudinal direction of the space vehicle, the non-zero angle being less than 25°, and the direction of alignment of the axis is inclined by approximately 25° to 40° on the horizontal.

12. Space vehicle according to claim 11, wherein the non-zero angle is greater than 15° and the direction of alignment of the axis is inclined by approximately 35° on the horizontal.

13. Space vehicle according to claim 7, wherein the space vehicle is a space plane.

14. Seat according to claim 1, comprising a braking mechanism and/or a stopping and disconnectable mechanism between the axis and the support structure.

* * * * *

UNITED STATES PATENT AND TRADEMARK OFFICE
CERTIFICATE OF CORRECTION

PATENT NO. : 8,360,368 B2  Page 1 of 1
APPLICATION NO. : 12/599503
DATED : January 29, 2013
INVENTOR(S) : Bertrand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this
First Day of September, 2015

Michelle K. Lee
*Director of the United States Patent and Trademark Office*